US009785924B2

(12) United States Patent
Zmuda

(10) Patent No.: US 9,785,924 B2
(45) Date of Patent: Oct. 10, 2017

(54) SYSTEM, SOFTWARE APPLICATION, AND METHOD FOR DISPLAYING THIRD PARTY MEDIA CONTENT IN A PUBLIC SPACE

(75) Inventor: Michael Zmuda, Itasca, IL (US)

(73) Assignee: NEC DISPLAY SOLUTIONS OF AMERICA, INC., Itasca, IL (US)

( * ) Notice: Subject to any disclaimer, the term of this patent is extended or adjusted under 35 U.S.C. 154(b) by 1013 days.

(21) Appl. No.: 12/914,300

(22) Filed: Oct. 28, 2010

(65) Prior Publication Data

US 2011/0270948 A1 Nov. 3, 2011

Related U.S. Application Data

(60) Provisional application No. 61/256,125, filed on Oct. 29, 2009.

(51) Int. Cl.
*G06F 15/16* (2006.01)
*G06Q 20/10* (2012.01)
*G06F 9/44* (2006.01)
*G09G 5/14* (2006.01)

(52) U.S. Cl.
CPC ........... *G06Q 20/10* (2013.01); *G06F 9/4443* (2013.01); *G09G 5/14* (2013.01); *G09G 2380/06* (2013.01)

(58) Field of Classification Search
CPC ..... G06F 9/4443; G09G 2380/06; G09G 5/14

USPC ......................................................... 709/217
See application file for complete search history.

(56) References Cited

U.S. PATENT DOCUMENTS

| 7,757,253 B2* | 7/2010 | Rappaport et al. ............. 725/41 |
| 2005/0060229 A1* | 3/2005 | Riedl ..................... G06Q 30/02 705/14.61 |
| 2007/0185762 A1* | 8/2007 | Takahashi ....................... 705/14 |
| 2008/0039197 A1* | 2/2008 | Walker et al. .................. 463/30 |
| 2008/0076506 A1* | 3/2008 | Nguyen et al. ................. 463/16 |
| 2009/0106659 A1* | 4/2009 | Rosser et al. ................. 715/730 |
| 2010/0083305 A1* | 4/2010 | Acharya et al. ............... 725/34 |

\* cited by examiner

*Primary Examiner* — Phuoc Nguyen
(74) *Attorney, Agent, or Firm* — Young & Thompson

(57) ABSTRACT

A system, method, and computer software application for the delivery and display of third-party multi-media content in a public space on locally managed display devices, wherein the delivery and presentation of the third-party multi-media content is manageable remotely from the public space, sale of display time for display on the locally managed display devices is manageable independently from local management, and the display and remote-management of the third-party content can co-operate and communicate with an incumbent multi-media management and display application operating on the locally managed display devices without requiring a re-tooling or custom programming of the incumbent multi-media management and display application.

23 Claims, 8 Drawing Sheets

SYSTEM, SOFTWARE APPLICATION, AND METHOD FOR DISPLAYING THIRD PARTY MEDIA CONTENT IN A PUBLIC SPACE

BACKGROUND OF THE INVENTION

Outdoor advertising, sometimes referred to as out-of-home advertising, is focused on marketing to consumers when they are 'on the go' in public places, in transit, waiting (such as in a medical office) and/or in specific commercial locations (such as in a retail venue). One example of this are electronic billboards located in retail outlets, typically comprising display devices (e.g., flat-panel display devices, cathode-ray tube display devices, etc.) operated by one or more computers. The computers controlling the display devices cause media content to be presented on the display devices, wherein media content may comprise readable text, still or moving images, or a combination thereof. For example, media content may be in the form of a binary file, storable within the memory of the controlling computer, wherein images and text are encoded with presentation information directing how, when, and in what order the images and text are presented. Examples of such media content are encoded in formats well known in the art, including but not limited to Microsoft® PowerPoint®, AVI, MPEG, Quicktime®, and equivalents. Media content may be stored as a file on a storage medium of the controlling computer, or may be streamed in real-time via a communications network (e.g., a Local Area Network (LAN) or the Internet).

The choice of what particular media content is presented on the display device is managed by Content Management Software (CMS) operating on the controlling computer, or alternately a server computer commonly connected to one or more display computers by means of a communications network so as to direct content on a plurality of display devices from a central point.

As the popularity of these out-of-home advertising systems has grown, so has the number of different CMS products to operate them. For example, one CMS system would typically be installed at a site of a retail organization (e.g., a supermarket) for the display of media content of interest to people patronizing the site. The maintenance and operation of the CMS would be provided by either the local or general management of the site. Accordingly, the media content provided on an electronic billboard system on the site will be limited to information about that particular store unless the management directs time and energy to collect additional advertising content from third parties.

Third-party advertising content can potentially generate substantial revenue from sales of advertising time on the organization's advertising system, such as to offset the costs of installing and maintaining the system. Third-party advertising content may also make the display devices more attractive to viewers by providing a greater variety of different and up-to-date media content than the local or general management can provide. However, managing media content created by third-parties, including soliciting third-party content, scheduling updating of third-part content, and addressing compatibility issues with third-party content with the CMS in place, is time-consuming and may involve skills outside the skill-set of the local or regional management.

Thus, there is a need for the capability to provide and manage third-party advertising for out-of-home advertising systems such as in-house electronic billboard systems by means of a remotely managed service. There is also a need for a third-party advertising system that can provide and manage third-party advertising to a plurality of different out-of-home advertising systems deployed at a plurality of different sites. However, the different out-of-home advertising systems and corresponding CMS products operating among different retail organizations and other out-of-home installations vary widely and are typically neither compatible nor interoperable with each other. For example, some CMS applications are commercial products, while others may be custom-designed products developed specially for a particular retail organization, such as by an in-house development team.

Further, out-of-home advertising systems and the CMS products that operate them are typically not adapted to have more than one means for control. Hence, to incorporate third-party content, the in-house management of the electronic billboard system would either have to manage the acquisition, presentation, and rotation of the third-party content themselves, or else would have to provide some form of direct control over their CMS to an independent, off-site manager, which for security, reliability, and other reasons, an in-house manager would be reasonably reluctant to do.

Thus, a need exists for a system and a method that can provide and manage third-party advertising on a remote out-of-home advertising system such as an in-house electronic billboard system via a remotely-controlled system that would be effective regardless of the particular CMS application in operation at a deployment site, such that third-party content can be provided and managed on the out-of-home advertising system remotely, without requiring the direct intervention of in-house management or the modification of the operative CMS system already in place. It is also desirable that the in-house management retain some amount of control over the third-party advertising delivered at the site, such that (for example) the third-party advertising content co-exist well with the incumbent media content of the operative CMS system.

SUMMARY OF THE INVENTION

The present invention was developed in consideration of the above problems, and various embodiments of the invention provide a capability to resolve or ameliorate one or more of said problems.

According to a first aspect of the present invention, there is provided a system comprising a display device and a display controller, the display controller being a computer (hereinafter, a computer is comprised of at least a CPU connected to a memory and a storage device, the storage device having recorded thereon an operating system adapted to control the CPU) having stored thereon a main presentation application and a priority presentation application, the operating system of the computer configured to enable the main presentation application and the priority presentation application to operate concurrently on the CPU, the main presentation application configured to cause the display device, by way of the operating system, to present a main display content as a main presentation, and the priority presentation application configured to cause the display device, by way of the operating system, to present a priority display content as a priority presentation, and to exclude the main presentation of the main presentation application from the display device for an entire duration of the priority presentation, and further configured to cause, through the operating system, a resumption of the main presentation on the display device upon completion of the priority presentation, wherein the main and priority display content each comprise any of still or motion video information.

The priority presentation application is configured to act upon the display device in response to a trigger, which may be any of a clock in accordance with a pre-programmed schedule and/or queue, a real-time signal generated by a sensor, camera, and/or human interface device (e.g., mouse, button, keyboard), and/or an event received from a networking interface connected to a local or wide-area network.

According to a second aspect of the present invention, there is provided a software product for presenting media content on a display controlled by a computer as above, the software recorded on a computer readable medium and configured to i) cause the computer to exclude a main presentation program running on the computer to prevent a main presentation of the main presentation program from being presented on the display, and also causing the computer to present a priority presentation on the display for an entire duration of the priority presentation, and ii) upon completion of the entire duration of the priority presentation, cause the computer to restore the main presentation program to resume presenting the main presentation on the display, wherein the main and priority presentations each comprise any of still or motion video information. The software further configures the computer to listen for events from any of a clock, a peripheral interface to a real-time sensor (e.g., a camera, mouse, button, keyboard), and/or an event received from a networking interface connected to a local or wide-area network, and to initiate the steps above beginning with the exclusion of the main presentation program and the presentation of the priority presentation in accordance with the event.

According to a third aspect of the present invention, there is provided a method for presenting priority media content in a public space, comprising i) providing a software product as above, recordable on a computer readable medium, for presenting media content on a display controlled by a display controller, and ii) providing a server (that is, a computer comprised of a CPU, a memory, a storage device, and a network interface for communicating with other computers, and configured to make computer-readable data available for retrieval by said other computers), the storage device of the server having software recorded thereon configured to cause the server to store priority media content readable by the software product operating on a display controller, wherein the software product is configured to cause the display controller to i) to exclude a main presentation program running on the display controller to prevent the display controller from presenting a main presentation on the display, and also causing the display controller to present a priority presentation on the display for an entire duration of the priority presentation, and ii) upon completion of the entire duration of the priority presentation, cause the display controller to restore the main presentation program thereby causing the display controller to present the main presentation on the display, wherein the main and priority presentations each comprise any of still or motion video information, and wherein the priority presentation is stored as the priority media content on the server and retrievable from the server by the display controller. The server may be available for direct communication with the display controller via an interconnected network (e.g., the Internet), or be in indirect communication with the display controller, such as by way of portable data media (e.g., floppy disks, portable Flash memory, cd-ROM, etc.) transferred between the server and the display controller by hand, or by way of an indirect network connection (e.g., a connection to a firewall, bridge, or gateway device in communications with a network connected to the server).

According to a fourth aspect of the present invention, there is provided an apparatus for presenting priority media content comprising at least one server as described above in communication via an interconnected network (e.g., the Internet) with at least one display controller and with at least one sponsor computer operated by a sponsor of priority media content to be displayed on the at least one display controller, the server being configured to address a software product stored in the at least one display controller, for presenting media content on at least one display device controlled by the at least one display controller, and the server being further configured to control the software product so as to cause the at least one display controller to display the priority presentation on the at least one display device and to cease displaying a main presentation on the at least one display device during the priority presentation.

According to a fifth aspect of the present invention, there is provided a system and method for exchanging, managing, distributing, and presenting media content between content providers and display devices, wherein a server computer receives media content from content providers (e.g., advertisers) and arranges for distribution of the media content to display controllers in communication with the server based in part on parameters provided by the content provider. The server may provide an interactive user interface for prompting and retrieving information from the content provider, as well as providing relevant information to the content provider including availability of time slots for display on display controllers available to the server. The interactive user interface may also provide a means for carrying out transactions with the content providers in exchange for storing, scheduling, and displaying media content on one of more display devices, as well as providing feedback to the content provider including indications that a media content has been played on one or more display devices.

These and other embodiments and advantages of the present invention may become apparent from the following detailed description, taken in conjunction with the accompanying drawings, illustrating by way of example the principles of the invention.

DETAILED DESCRIPTION OF PREFERRED EMBODIMENTS

Figure 1:
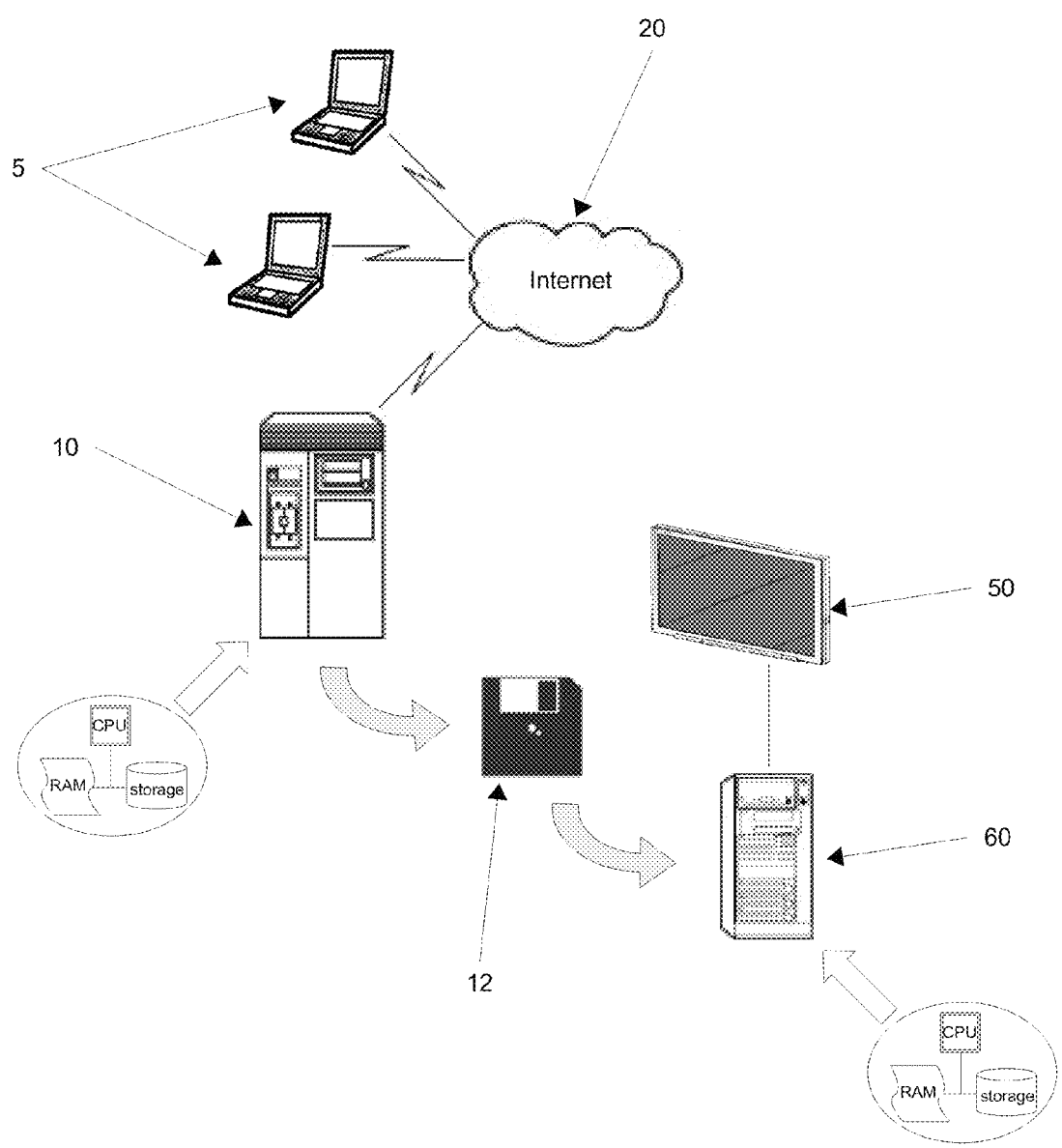
FIG. 1 illustrates an exemplary arrangement of an electronic billboard system and a third-party content server according to the invention.

FIG. 1 schematically illustrates an elementary arrangement in accordance with the invention including a server 10 for storing priority media content readable by the priority presentation software application of the invention. The server 10 may comprise a single server device, a cluster of interoperating or redundant load-balancing server devices, or the equivalent as known in the art. The priority media content includes one or more priority presentations, storable as binary information (e.g., one or more files) on a computer-readable medium in a manner known to those of skill in the art. A priority presentation is a binary data presentable as a combination of still or moving text and/or graphics operable for presentation on a multi-media device for a predetermined period of time. Examples of binary media content are known in the art (e.g., Macromedia® Flash®, Microsoft® PowerPoint®, Apple® Quicktime®, etc.).

In an embodiment of the invention, the server 10 is in communication with client computers 5, through which content providers may retrieve data from the server 10 representing availability of display devices 50 for display of media content, and through which content providers may transmit media content to the server 10 for storage and distribution to display controllers 60.

A display controller 60 is connected to a display device 50, which may be deployed in a public space for viewing. The server 10 and the display controller 60 may be any computing device comprising a storage device (e.g., RAM, disk drive, portable Flash memory, cd-ROM, etc.) and a central processing unit ("CPU"). At least the display controller 60 would have running thereon an operating system configured to execute more than one process at a time (a multi-tasking operating system, e.g., Microsoft® Windows® XP Professional) and would also comprise interfacing hardware for connecting to and operating a display device 50. The display controller 60 may also comprise interfacing hardware for connecting to and operating a speaker or audio device for producing sound. One or more speakers may be integrated as part of the display device or be deployed separately. The display device 50 may be any of a cathode-ray tube ("CRT") display, a liquid crystal display ("LCD") or plasma flat-panel display, or an equivalent device for presenting computer-generated visual images.

In an embodiment, the display controller 60 and display device 50 may further comprise feedback devices configured to take measure of the area surrounding the display device and also the operative status of the display controller 50. These devices may include, but are not limited to, computer self-diagnostic devices, an infrared motion detector, a laser motion detector, a still or motion-picture camera, a door sensor or floor-based traffic sensor, and an RFID detector. These devices are configured, at least, to determine whether potential viewers are nearby the display device 50 before, during, or after a presentation of media content. Devices may also be included with either of the display device 50 of the display controller 60 to determine environmental information of the surrounding area, including (but not limited to) temperature, humidity detectors, smoke, radiation, or other environmental conditions or hazards.

The priority presentation software ("PPS") application of the invention is loaded on a storage device of a display controller 60. Content Management Software as described above (hereinafter referred to as a main presentation software or "MPS" application) is also loaded on a storage device of the display controller 60. Priority media content readable by the PPS application is provided from the server 10 to the display controller 60 by any effective data transmission means 12 (e.g., floppy disk, cd-ROM, flash disk, or equivalent). The server 10 may also provide scheduling information for instructing the PPS application when and under what conditions the any part of the priority media content should be displayed on the display device 50 as a priority presentation.

Figure 2:
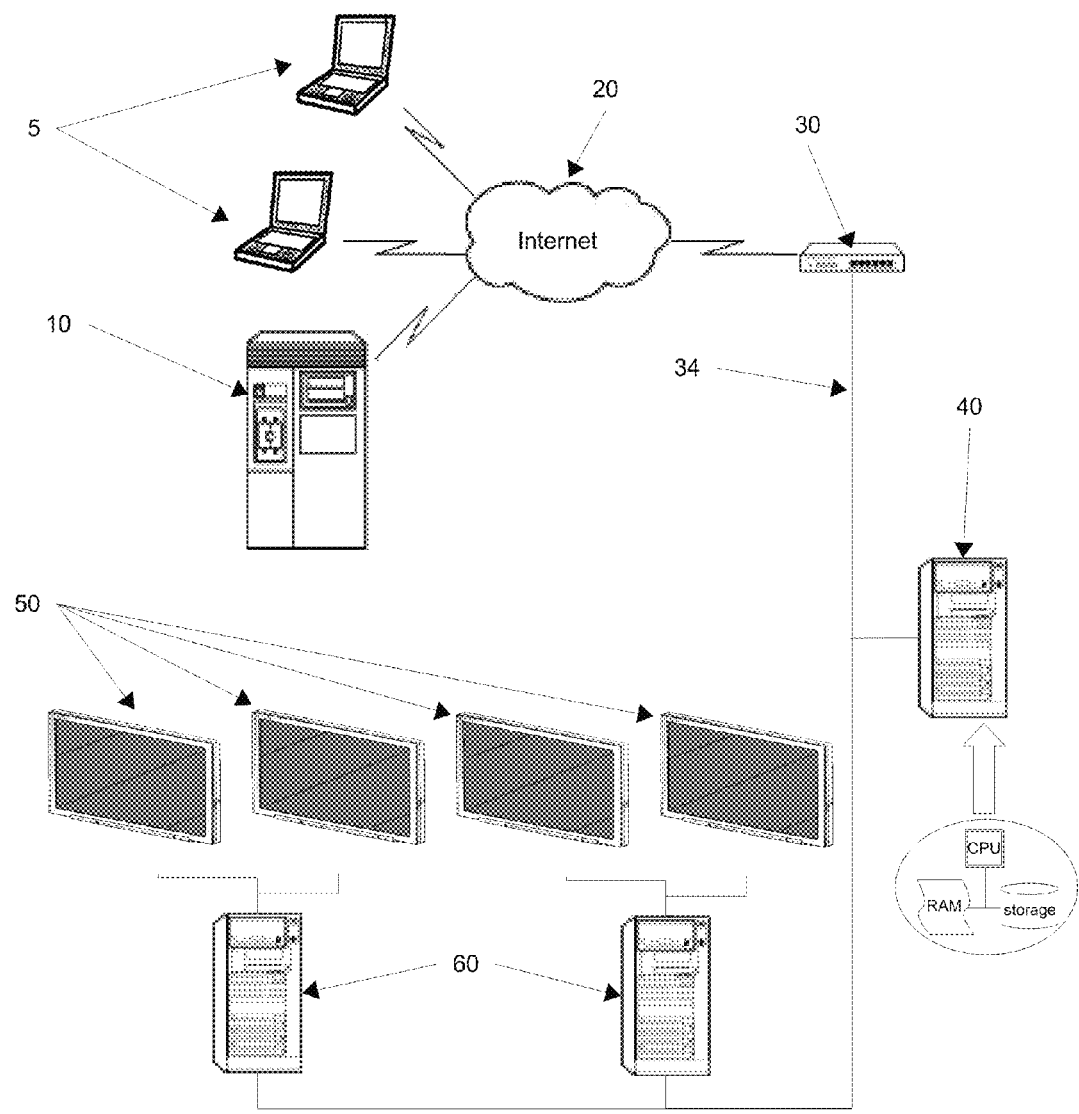
FIG. 2 illustrates another exemplary arrangement of an electronic billboard system and a third-party content server according to the invention.

FIG. 2 schematically illustrates an exemplary arrangement wherein the server 10 is connected by way of a wide-area network 20 (e.g., the Internet) to a network router 30. The network router 30 connects the server 10, via a local area network 34 ("LAN") which may be cabled or wireless, to a plurality of display controllers 60. In the example illustrated in FIG. 2, each display controller 60 is connected to two display devices 50. A display controller may be connected to any number of display devices 50 as supported by the display interfacing hardware constituted therein.

In this embodiment, the display devices 50 may be provided in a public area such as a retail store. The management of the public area would provide administrative services for the display devices, the display controllers 60, and the LAN that connects them. Also in this example, the LAN is connected to the Internet 20 via a router 30. The management of the public area, by way of a site manager, also operates its own in-house server 40 on the LAN to perform various computer-related functions, such including support functions for the display controllers 60 in communication with the in-house server 40 as generally known in the art.

Figure 3:
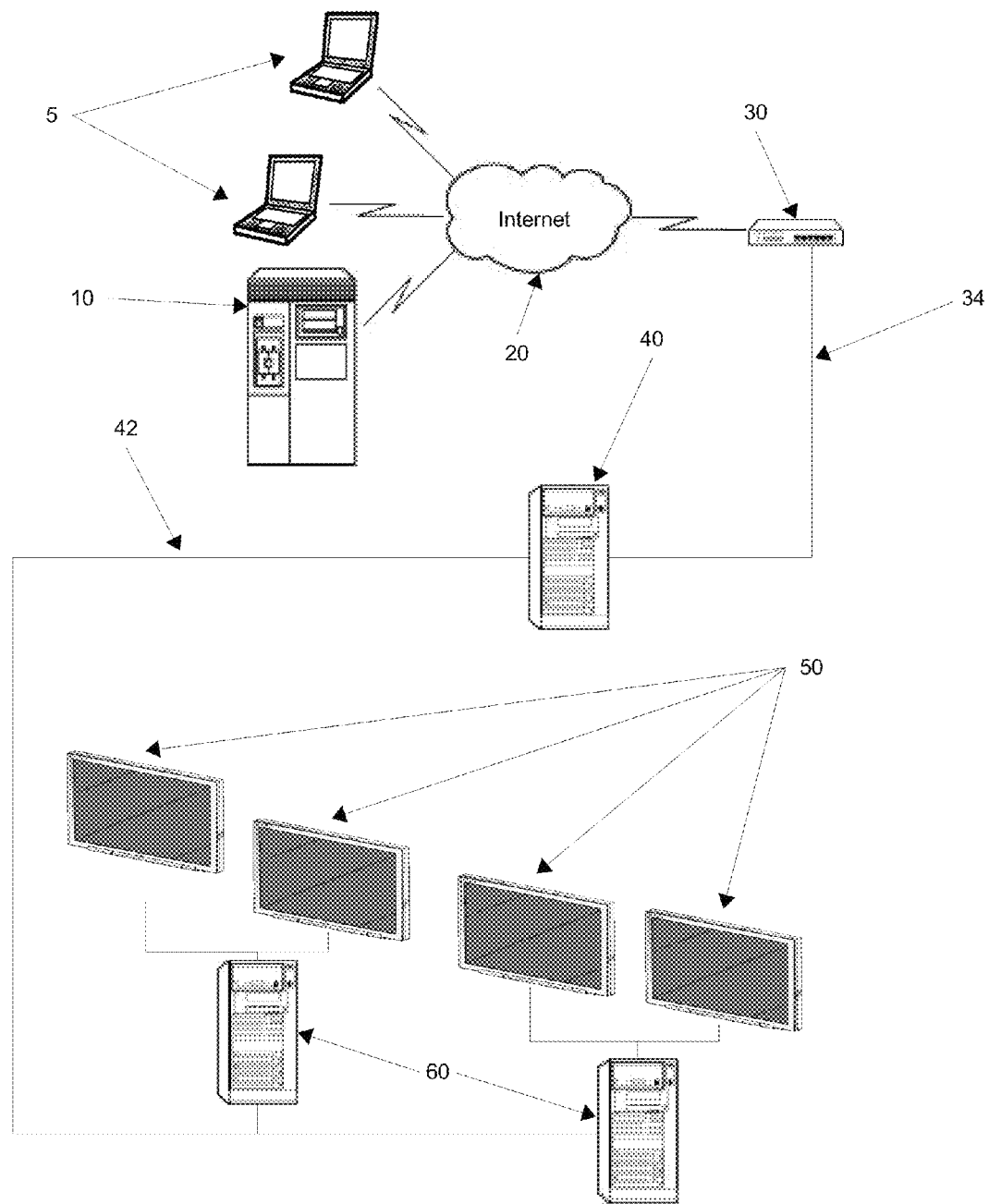
FIG. 3 illustrates yet another exemplary arrangement of an electronic billboard system and a third-party content server according to the invention.
Figure 4:
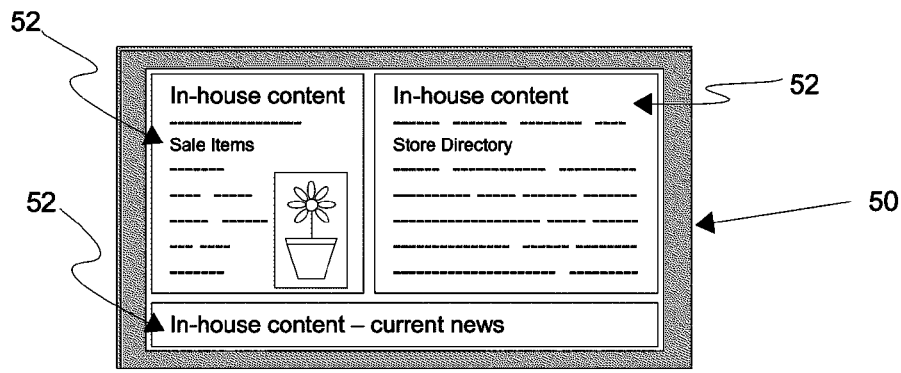
FIG. 4 illustrates an exemplary display screen whereupon in-house content is displayed, including text and graphics.

In an embodiment, as illustrated in FIG. 3, communication between the server 10 and the display controllers 60 takes place through an intermediate computer, here shown as the in-house server 40. In this embodiment, the display controllers are in communication with the in-house server 40 via a private LAN 42 which may be cabled or wireless. The in-house server is connected to both the private LAN 42 and the LAN 34 in connection with the wide-area network 20 via the network router 30. In this embodiment, the in-house server 40 is provided with a sync server application configured to cause the in-house server 40 to operate as a proxy or sync server between the server 10 and the display controllers 60, such that the display controllers 60 are not in direct communication with either the of the wide-area network 20 or the server 10. By isolating the display controllers 60 from a wide-area network the wide-area network 20, the display controllers are more secure from unauthorized control (e.g., from unauthorized communications from the Internet).

As indicated above, one or more display controllers 60 operate one or more display devices 50. The operation is normally performed by Content Management Software or main presentation software application maintained by the management of the public area. The main presentation software application, e.g., Content Management Software ("CMS"), may be centrally administered by the in-house server 40.

Figure 8:
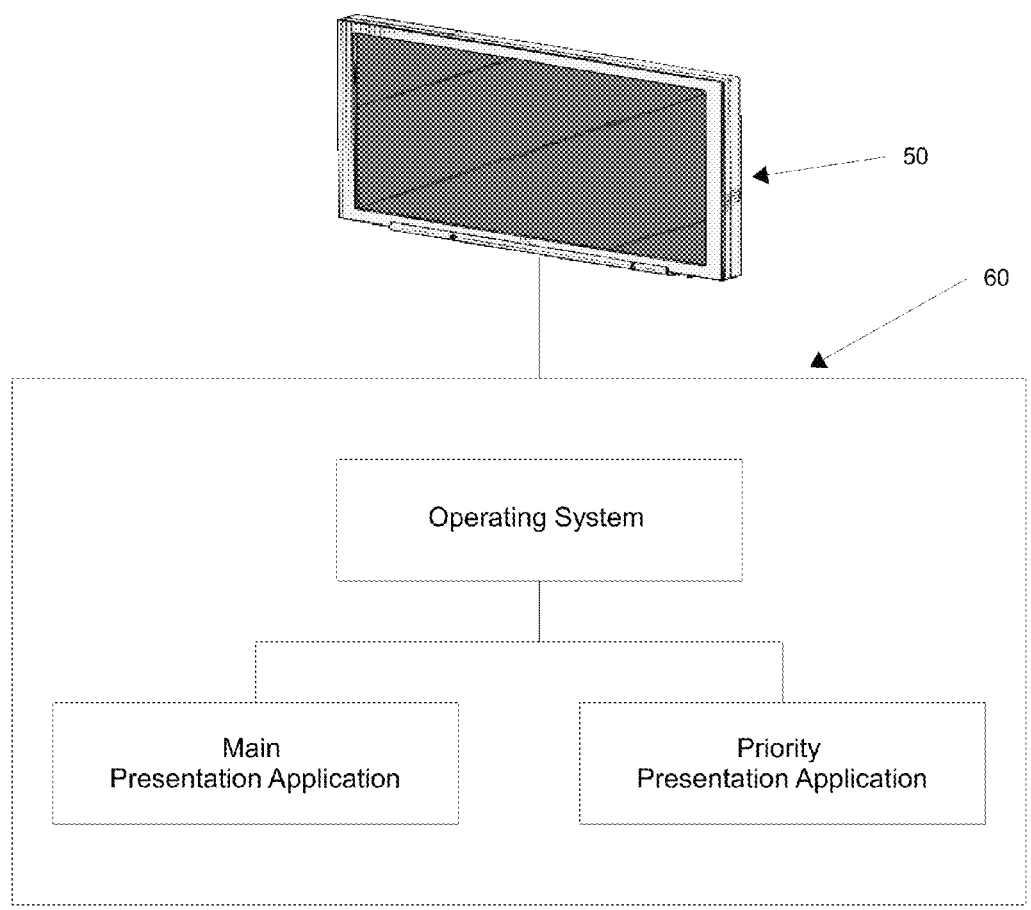
FIG. 8 diagrammatically illustrates an organization of the operating system, the main presentation application, and the priority presentation application operating in the CPU and the memory of the display controller.

The PPS application of the invention is loaded and executed to run at the same time as the MPS application as provided by the operating system of the display controller, as schematically illustrated in FIG. 8. Those skilled in the art will understand that these two software applications are both maintained in the memory of the display controller and concurrently managed by the operating system.

Figure 7:
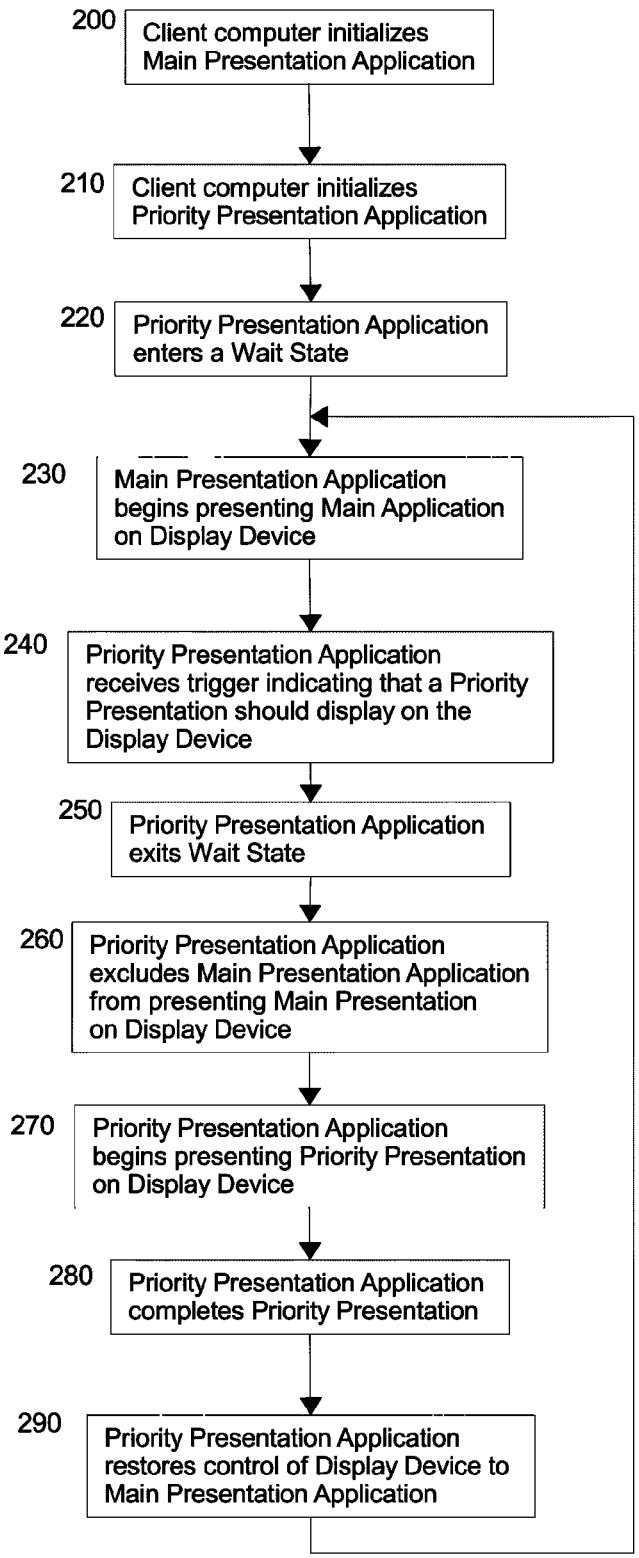
FIG. 7 is a flow chart schematically illustrating the essential steps of the invention operating on a client display controller.

The flow chart in FIG. 7 diagramatically illustrates the essential operation of the inventive PPS application. The MPS application and the PPS program are initialized (steps 200, 210) on the display controller 60. Those skilled in the art understand that these initialization steps need not necessarily occur in this order, so long as they both are to occur.

Once the MPS application is initialized and begins operation, the main presentation is presented to the display device 50 (step 230). The main presentation may appear as a combination of still or moving text and graphics 52 as in FIG. 2. Once the PPS application is initialized and begins operation, it enters a wait state (step 220) wherein it awaits a trigger. The trigger may be any of (but not limited to) a time interval, a time of day, a signal provided over the network connected to the display controller 60, a signal provided by a user interface device (e.g., a keyboard, mouse, touchpad), any of the feedback devices described above, or equivalent.

Upon the detection of the trigger (step 240), the PPS application exits the wait state and executes subroutines stored on the storage medium of the display controller 60 to exclude the MPS application from presenting its presentation content to the display device 50 (step 250). Those of skill in the art will understand that the MPS application is prevented from making any changes to the images on the display device 50, and the PPS application executes subroutines stored on the storage medium to establish exclusive control over the display device 50.

Figure 5:
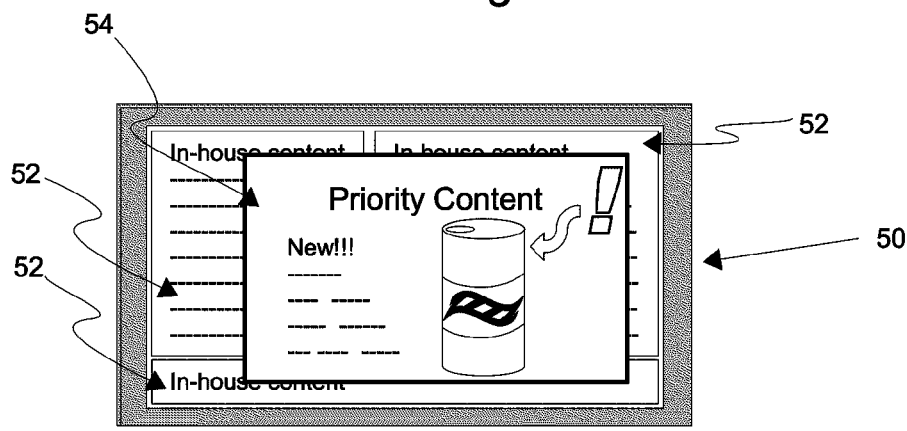
FIG. 5 illustrates an exemplary display screen where the inventive application excludes the in-house content from being displayed over a portion of the display screen, and a priority content is displayed in that portion.
Figure 6:
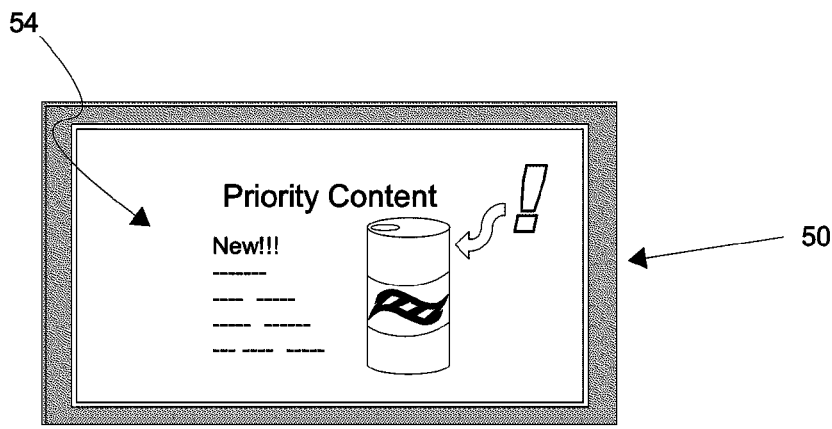
FIG. 6 illustrates an exemplary display screen where the inventive application excludes the in-house content from being displayed over an entirety of the display device, and a priority content including text and graphics is displayed in that entirety.

Once control over the display device 50 is established, the PPS application begins presenting the priority presentation on the display device 50 (step 270). The priority presentation may appear as a combination of still or moving text and graphics 54 as in FIG. 6, wherein the priority presentation is presented over an entirety of the display device 50. Alternatively, FIG. 5 illustrates the priority presentation presented over only a portion of the display device 50, where other portions of the main presentation remain visible outside a presentation area established exclusively for the priority presentation.

Exclusive control over the display device 50 is maintained until the priority presentation is complete (step 280), whereupon the PPS application executes subroutines stored on the storage device of the display controller 60 to relinquish the exclusive control over the display device 50 and re-enable control of the MPS application over the display device 50 (step 290). The PPS application then returns to the wait state and awaits the next trigger.

In an embodiment, the display controller 60 includes subroutines to record, on the storage device of the display controller 60, proof-of-play information upon completion of each priority presentation. In this embodiment, the PPS application further includes routines to store a proof-of-play record, including the time and date, upon the completion of any priority presentation. These proof-of-play records provide proof that an entirety of the priority presentation was presented.

In an embodiment, the proof-of-play records are transmitted over the network 34, 20 to the server 10 on a periodic basis. The proof-of-play records may be transmitted as a file or a stream, using a protocol known to those skilled in the art (e.g., FTP, SSH, SCP, HTTP, HTTPS, etc.). In the arrangement illustrated in FIG. 2, the PPS application is configured to establish a connection with the server 10 and attempt to authenticate with the server 10 in order to complete the connection. Upon a successful authentication, the PPS application causes the display controller 60 to transmit the proof-of-play records, and the server 10 stores the proof-of-play records along with the authentication information to provide at least statistical information with respect to the distribution and play of any particular priority presentation among the display devices 50.

In an embodiment, trigger information may be embedded in priority media content, or provided separately in the scheduling information provided by the server 10. Trigger information is usually tied to a particular priority presentation such that under the predetermined conditions, the particular priority presentation will be presented. As indicated above, the predetermined conditions may include (but is not limited to) a time of day, a frequency within a time period, a signal from one or more feedback devices, an signal from the network connected to the display controller, or a combination of any or all of the preceding.

In an embodiment, trigger information is encoded within the main presentation of the MPS so that the presentation of the priority content of the PPS may be automatically synchronized with the content of the MPS. Often, the MPS has the capability to include Uniform Resource Locator (URLs), such as an "address" to a web page in accordance with the http or https URL schemes, in either of a particular presentation content or a playlist/schedule of content so that a main presentation may thus incorporate content that resides on a network (e.g., the Internet) with its native content. For example, the MPS would include a URL to a weather forecasting site on the World Wide Web in its playlist so that, at an appointed time in the playlist schedule, the MPS would retrieve and display content from the weather forecasting Web site. In another example, the MPS has the capacity to playback multi-media files encoded according to the Adobe® Flash® format, which in turn has the capability to include URLs to incorporate network-based content as described in the previous example.

In this embodiment, the PPS is configured to listen for a request from the MPS in the form of a URL. When an MPS has the capability to include a URL in its content or playlist, the MPS is configured to include a URL directed to the PPS so that, at a pre-appointed time, the MPS makes a network resource request using a standard communications protocol like Hypertext Transfer Protocol (HTTP), wherein the request is specifically directed to the PPS.

In an example of this embodiment, the PPS is configured to listen for HTTP requests on a predetermined TCP/IP port (e.g., the usual web port 80). When the PPS receives the URL request from the MPS at the predetermined TCP/IP port, the PPS application generates a trigger event to present one or more priority presentations.

In this embodiment, the PPS may respond to the MPS by transmitting a file or stream back to the MPS, thus handling the request initiated by the URL as known in the art and therefore not forcing the requesting routine at the MPS to "time out." However, the PPS of the invention, having generated a trigger in response to receiving the URL request, proceeds to establish control over the display device 50 and exclude the MPS from presenting content on the display device 50, as described above. Thus, for the duration of a priority presentation so triggered by the transmission and reception of the URL, display content of the MPS will normally not be displayed by the display device 50.

The file or stream transmitted back from the PPS to the MPS in response to the URL request may be, for example, an empty file, a still image, or a short "place holder" message that may include diagnostic information or other messages. In a variation of this embodiment, the PPS may retrieve text, graphics, or other content from another source on the network or Internet, and forward same to the MPS. The file or stream transmitted back from the PPS to the MPS may be controlled or partially controlled by way of one or parameters included in the requesting URL.

Again, this content would normally not be displayed on the display device 50. However, in the event that an error occurs preventing the PPS from establishing exclusive control over the display device 50, or some other circumstance where it is necessary or desired that the PPS not establish exclusive control and MPS content is displayed on the display device 50 (such as by means of a control parameter), the content provided to the MPS by the PPS would be displayed to prevent the display device 50 from showing blank content. In the event of an error, for example, technical information may be displayed to assist a technician in diagnosing the error.

This embodiment permits the PPS to not only run concurrently with a variety of different CMS programs (MPS), but also permits the PPS to be controlled by the MPS so that presentations may be synchronized with the MPS without the need for designing an application program interface (API) specific to each of the different CMS programs in use. That is, the interaction between the PPS and MPS can be controlled simply by the insertion of a special URL into the playlist of the MPS at the time that the playlist for the other network content is prepared; all that is assumed is that the MPS is capable of incorporating web or Internet-based content in its playlist. The special URL triggering the display changeover from the MPS content to the PPS content may take the form of an HTML file, XML file, Macromedia® Flash® file, or other files and formats known in the art capable of being included in the playlist of the MPS. Such a file is preferably supplied by the advertising system server 10 and may be downloaded by the site manager from the advertising system server 10.

In an embodiment of the invention, the PPS is configured to parse and interpret parameters included in the URL to control or influence the presentation of the priority content to be displayed, the control parameters including but not limited to: i) an amount of time before control of the display is captured by the PPS and playback of priority media content commences, ii) an amount of time before the priority playback is to end and control of the display is returned to the MPS, iii) a number of how many priority presentations are to be played back, iv) a specification of a particular priority presentation to be played back, v) a specification of a predetermined class of priority presentations to be played back. With respect to the latter, a predetermined class that would be expressly specified by the control parameters may include (but is not limited to) public service announcements, or particular priority presentations most pertinent to presentation content of the MPS that was most recently played and/or will shortly be played in the future.

In this embodiment, the file or stream transmitted back to the MPS may include confirmation and diagnostic messages acknowledging receipt of the control parameters, as well as any other useful or pertinent information such as whether the control parameters were successfully applied.

As an example of the operation of this feature, the MPS running on the display controller 60 presents its content on the display device 50 while the PPS running on the display controller 60 waits for an event to trigger it into action. Here, the MPS operates according to a playlist, which is a queue of media content to be displayed on the display device 50 one after another. In particular, the MPS has the capability to incorporate into its playlist a URL for retrieving content from a network resource. It is of course understood in the art that a network resource may reside at a different computer device than the display controller 60, or may merely reside at a process or application operating on the same computer device (i.e., the display controller 60 itself).

One of the items of media content in the playlist includes a URL directed to a TCP/IP port 80, on which the PPS is listening. For example, the item may be a file referenced in the playlist that comprising HTML code wherein a URL is embedded in accordance with HTTP protocol, or the item in the playlist may be a Macromedia® Flash® file including a URL embedded therein, or any other means known in the art by which the MPS may include a URL within an item in its playlist.

Further, for the convenience of the site manager, the URL may be included as part of a file as aforementioned that is downloaded by the site manager from the server 10. The site manager, having downloaded the file, incorporates the URL contained within the file into the playlist of the MPS.

Once the MPS advances to the position in the playlist where the URL is located, the MPS in its normal manner sends a message in an attempt to retrieve the resource to which the URL is directed. The PPS receives this message, and responds with some HTML-based content so that, at least, the MPS in attempting to retrieve a resource does not time-out. However, at the same time, the PPS initiates the process of taking control of the display device 50 from the MPS, as described above.

The parameters passed with the URL from the MPS to the PPS are interpreted by the PPS to control what priority content is presented by the PPS. The control may include a specification as to a particular priority content to be presented, and/or may specify an amount of time before the PPS relinquishes control of the display device 50 back to the MPS.

In accordance with this feature of the invention, the MPS may control when the PPS activates from its wait state and presents its content. The playback of the PPS content may thus be synchronized with the playback schedule of the MPS, so that playback of the respective content of the MPS and the PPS do not overlap or interrupt each other. In particular, this feature does not require an incumbent MPS to be modified or re-programmed in order to communicate with the PPS, but may rely on a common capability to make requests for network content under the common URL, HTTP, and HTML protocols.

In an embodiment, the PPS application may also transmit status information to the server 10 about the operating status of the display controller 60 (e.g., system load, system up-time, available storage space and memory, and/or errors detected and recorded).

In an embodiment, arranged as in FIG. 2, a subroutine of the display controller 60 contacts the server 10 over the network 34, 20 on a periodic basis to retrieve updated priority media content and scheduling information. The priority media content may be transmitted as a file or a stream, using a protocol known to those skilled in the art (e.g., FTP, SSH, SCP, HTTP, HTTPS, etc.). The PPS application is configured to establish a connection with the server 10 and attempt to authenticate with the server 10 in order to complete the connection. By requiring the PPS application to contact the server 10 and not the other way around, the PPS application is capable of communicating via a firewall (operating, for example, in the network router 30) without requiring special configuration.

Connection and authentication may be established by any method known by those of skill in the art, wherein the PPS Application includes subroutines and data as required to successfully complete authentication (e.g., a unique identification, password, and/or a public encryption key, as known in the art). Upon a successful authentication, the server 10 transmits the priority media content, containing one or more priority presentations, to the display controller 60 and the PPS application causes the display controller 60 to store the priority media content on its storage device. The server 10 also transmits scheduling information which the display controller 60 stores on its storage device to be read by the PPS application to control when and/or how often a priority presentation of the priority media content is displayed on the display device 50.

In the same manner, the PPS application may be configured to contact the server 10 and retrieve software updates intended to improve the operation of the PPS application, the updates being in the form of a data transmission as known in the art.

The PPS application may engage in communication with the server 10 regardless of whether the PPS application is also (i.e., simultaneously) presenting a priority presentation on the display device 50.

In an embodiment, the display controller 60 further includes an audio controller (e.g., an audio interface, sound card, or equivalent) and an audio output device (e.g., a speaker) the main and priority presentation each further include audio information, such as a voice-over or background music to accompany the visual information presented as the main and priority presentation.

When the PPS application exits the wait state and the MPS application is excluded from presenting its presentation content to the display device 50, sub-routines stored on the storage device of the display controller 60 cause the display controller 60 to also exclude the MPS application from causing the audio controller from presenting an audio portion of the MPS application, and further to establish exclusive control of the audio controller for an audio portion of the priority presentation, thereby allowing audio only from the priority presentation to be broadcast from the audio output device for the duration of the priority presentation. Upon completion of the presentation program, sub-routines stored on the storage device of the audio controller are executed to relinquish the exclusive control over the audio controller and re-enable control of the MPS application over the audio controller before the PPS application returns to the wait state.

Those of skill in the art will understand that, like the PPS application, a MPS application will usually incorporate routines of its own to establish an exclusive control of its own over the display device 50. Hence, the PPS application of the invention executes routines designed to temporarily overcome and suppress the display-capture routines of the MPS application for at least as long as the priority presentation is to play on the display device 50. In particular, capturing and relinquishing control over the display device 50 (steps 240 and 290) is accomplished by different methods, depending upon the MPS application operating on the display controller 60.

Figure 9:
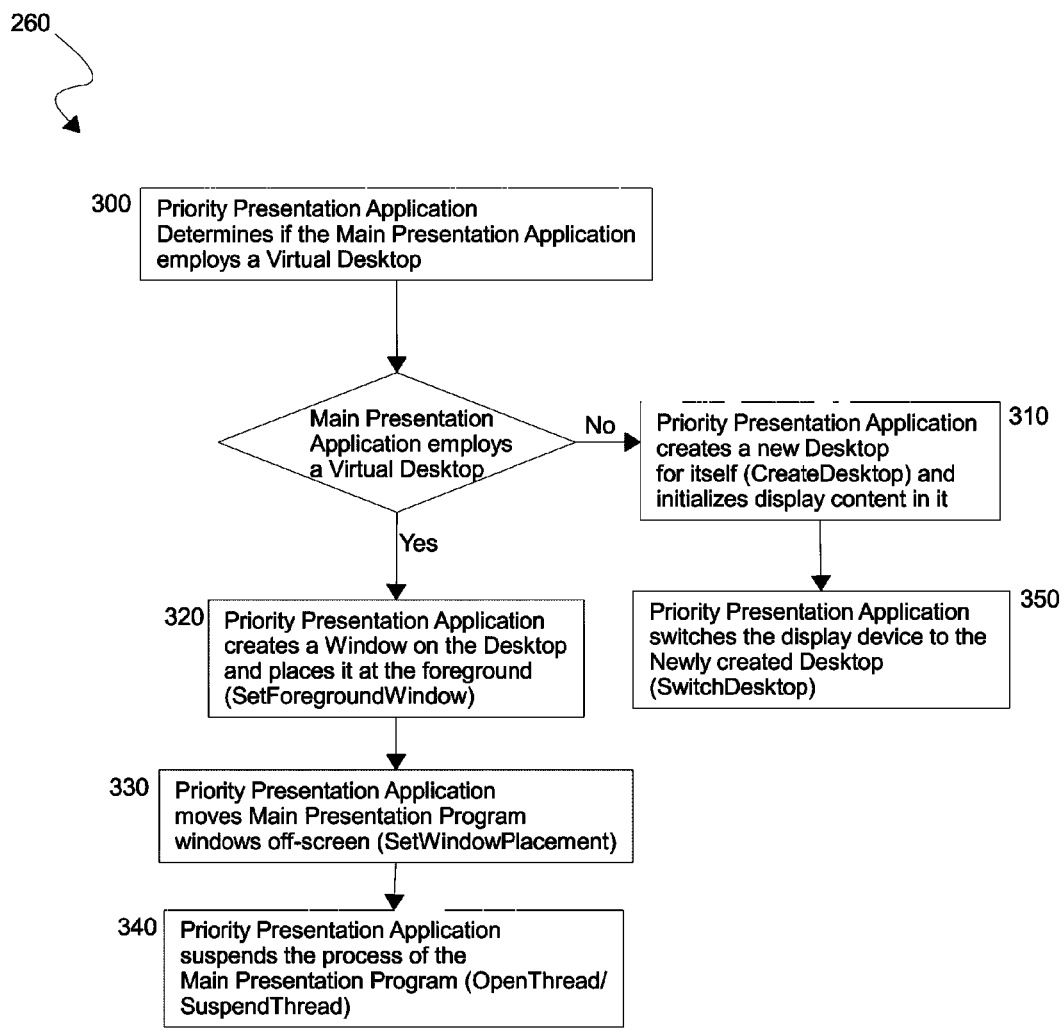
FIG. 9 is a flow-chart detailing the operation of the step wherein the priority presentation application excludes the main presentation application from the display device of the display controller.

In an embodiment, wherein the PPS application and MPS application operate in the Windows® environment (here, Microsoft® Windows® XP Professional) on the display controller 60, the PPS application makes calls to subroutines in the Win32 API to create a new desktop (CreateDesktop) and then cause the operating system to direct the display content of the PPS application to it (see FIG. 9, step 310). Those of skill in the art will recognize that the Windows® graphical user interface environment is based upon a display surface, represented on the screen of the display device 50, known as a desktop. Windows® provides a default desktop upon startup that is used by applications during normal use, but that there is also provided a means to create another, alternate desktop, distinct from the default desktop by way of the CreateDesktop call. A new desktop created in this manner is configured for the exclusive use of an application that requests it.

As further provided schematically in FIG. 9, the PPS application also makes a call to switch the display device 50 from displaying the main desktop to the new desktop (SwitchDesktop) (step 350). As a result, the applications that were running and displaying content on the display device 50 prior to the CreateDesktop call, including the MPS application, disappear from the display device 50 to be replaced by the new desktop containing wherein the PPS application is exclusively providing its own display content (the priority presentation).

Figure 10:
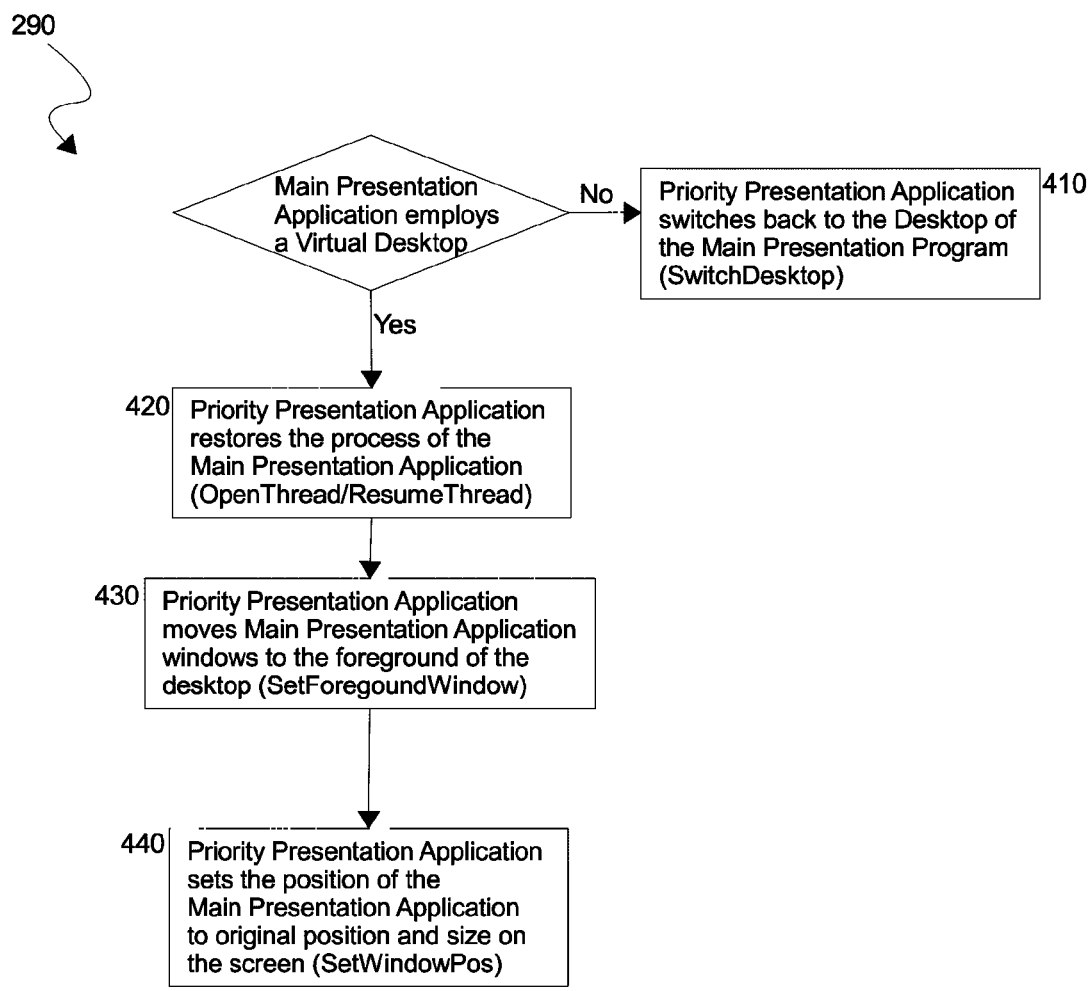
FIG. 10 is a flow-chart detailing the operation of the step wherein the priority presentation application restores the main presentation application to the display device of the display controller.

FIG. 10 schematically details the sub-steps of step 290 where control is restored to the MPS. Upon the completion of the priority presentation, the PPS application again makes a call to SwitchDesktop to restore the contents of the original desktop to the display device 50 (FIG. 10, step 410). Even though the original desktop was not being displayed on the display device for a time, applications such as the MPS application continue to operate uninterrupted on the display controller 60, except that they are not displayed on the display device 50.

However, where the MPS application employs a similar technique of CreateDesktop and SwitchDesktop calls to acquire exclusive control of the display device 50, the PPS application must use an alternative method to acquire and maintain exclusive control. In addition, where the main presentation and/or the priority presentation include audio portions, the PPS application calls routines in the Win32 API to temporarily suspend the execution of the MPS application, thereby preventing the MPS application from either re-acquiring control of the display device 50 prematurely or playing its own audio content on top of that of the priority presentation.

Here, the PPS application is configured to determine (FIG. 9, step 300) that it is necessary to suspend the MPS application rather than merely displacing it with a new desktop, the PPS application in this embodiment will suspend the process of the MPS application.

In an embodiment, the PPS application makes the determination of step 300 by identifying the application name of the MPS application and comparing it to a list of known MPS applications compatible with the steps outlined above. If the PPS application determines that the foregoing steps will not be fully effective to exclude it from the display device 50, the PPS application proceeds with an alternative procedure.

In an embodiment, the alternative procedure for excluding the MPS application includes the PPS application executing routines to initialize its own display content and bring it to the foreground of the existing desktop (SetForegroundWindow) (step 320). The PPS application also makes a call to move the MPS application operating on the desktop to positions off the display area of the display device 50 (SetWindowPlacement) (step 330). Then, the PPS application makes calls to OpenThread and SuspendThread with the Process ID of the MPS application (step 340), thereby temporarily stopping the operation of the MPS application. The PPS application then proceeds to play the priority presentation (step 270).

Upon the completion of the priority presentation (step 280) where the MPS application is known by the PPS application to require suspension, the PPS application brings the MPS application out of suspension (step 420) by calls to OpenThread and ResumeThread. The PPS application then restores the positions of the MPS application to the visible foreground of the desktop with a call to SetForegroundWindow (step 430), and also restores the MPS application to its original position on the desktop with SetWindowPos (step 440).

In this way, the PPS application can co-exist on a display controller 60 with a MPS application and display content on the display device 50 independently of the operation of the MPS application. As described above, the PPS application determines an appropriate method for taking control of the display device from the MPS application, without the MPS application having to be altered, reconfigured, or recoded. Accordingly, the display controller 60 is enabled to provide third-party content in addition to any content provided by the MPS application with a minimum of technical effort required by the local managers at the display site.

In an embodiment of the invention, features of the MPS application are integrated with the PPS application, hereinafter referred to as an Integrated Presentation Software (IPS) application. In this embodiment, the IPS application functions in place of the MPS application on the display controller 60.

As with the MPS application described above, the IPS embodiment of the PPS application operates as a Content Management Software as described above for presentation of media content. The IPS embodiment is further configured with all the features of the PPS application described above, with the addition of the following.

As there is no MPS application in this embodiment, the IPS embodiment is not required to execute routines to exclude an MPS application from control of the display device 50 upon the event of a trigger. Instead, the IPS embodiment, configured to operate as the MPS application on the display controller 60, is configured to cause the display controller 60 to present media content to the display device 50, and further to simultaneously detect the event of a trigger.

As with the PPS embodiment described above, the IPS embodiment may detect a trigger as any of (but not limited to) a time interval, a time of day, a signal provided over the network connected to the display controller 60, a signal provided by a user interface device (e.g., a keyboard or mouse), or equivalent.

Upon detecting an appropriate trigger, the IPS embodiment causes the display controller 60 to switch from displaying the main presentation on the display device 50 to displaying a priority presentation on the display device 50. As with the PPS described above, the IPS embodiment is configured to present the priority presentation until it completes; thereupon, the IPS embodiment resumes presentation of the main presentation and awaits the event of another trigger.

The invention also provides for a method for providing third-party content to an out-of-home advertising system as described above.

In an embodiment, a content manager provides a PPS application as described above to be installed and executed on a compatible display controller 60 and display device 50 at a deployment site managed by a site manager. A deployment site may be, for example, a shopping center, a retail store or supermarket, restaurant, or any other indoor or outdoor public place. A site manager may be, for example, a local manager of a supermarket or a shopping center.

In this embodiment, the site manager registers with a content manager by providing information about the local computing and display equipment at the site. The content manager provides a medium, e.g., a Flash memory, cd-ROM, or networked storage device containing the PPS application in either of an executable form ready to be executed by a display controller 60 or else an installable form known to those of skill in the art ready to be transferred to the storage device of the display controller 60 and configured into the executable form.

From the medium, the site manager operating the display controller can configure the PPS application to begin executing on the display controller 60.

The content manager also provides a server 10 as described above in connection with the wide-area network such as the Internet 20. The server 10 may comprise a single server device, a cluster of interoperating or redundant load-balancing server devices, or the equivalent as known in the art.

In operation, the PPS application of the display controller 50 periodically attempts to make contact with the server 10 via the Internet 20, as described above. The server 10 provided by the content manager is configured to wait for, authenticate, and accept connections from one or more display controllers 60 or in-house servers 40 with the respective PPS applications operating thereon. Connection and authentication may be established by any method known by those of skill in the art. Upon successful authentication, the server 10 is configured to transmit priority media content particularly for display by the PPS application operating on the display device 50 of the display controller 60, as described above.

In an embodiment, the server 10 provided by the content manager is also configured to provide scheduling information for use by the PPS application to control when and/or how often a priority presentation of the priority media content is displayed on the display device 50.

In an embodiment, the server 10 provided by the content manager is also configured to receive proof-of-play records from the display controller 60 as described above.

In an embodiment, the server 10 provided by the content manager is also configured to provide updates to the PPS application, the updates being in the form of a data transmission as known in the art to be incorporated into the PPS application in order to improve the performance of the PPS application against a greater plurality of MPS applications.

In an embodiment, the content manager may provide any of display devices 50 and/or display controllers 60 to the deployment site, the display controllers 60 including a PPS application as described above.

In a variation of the embodiments of the method provided above, the PPS application provided is in the form of an IPS embodiment, as described above.

The invention also provides for a method for receiving an electronic request over the wide-area-network 20, from a PPS application or an IPS embodiment deployed on a display controller 60 as described above, via a server 10 configured as described above, and providing display content for display by the PPS application via a display device 50.

In an embodiment of the method, the content manager also provides facilities enabling communication with one or more content providers for the creation, submission, and scheduling of priority content for display on the display devices 50 under the control of the PPS application (or IPS embodiment) in communication with the server 10. The content manager also provides facilities to manage transactions with the content providers for sale of the use of the display devices 50 in presenting the priority content.

In an embodiment of the method, the site manager registers with the content manager by providing a profile characterizing the demographics of people who may view a particular display device 50 at any point in time. In assembling the profile, the site manager may perform an audit of the network under his or her control, particularly including specific information with regard to each display device 50. This specific information, provided on a per display device basis, includes but is not limited to i) location of the display device, ii) number of people within sight of the display device based on time of day, iii) age group and other demographic information of the people within sight of the display device, iv) type of media content provided by the MPS and displayed on the display device, and v) amount of time set aside for priority content. In an exemplary embodiment, this audit is performed on a periodic basis in accordance with standards developed by the Out-of-home Video Advertising Bureau (OVAB) and the Media Ratings Council (MRC).

In this embodiment, the content manager tracks the availability and the demographic characteristics of the display devices 50, and also maintains records and statistics of deployments of the PPS applications, including but not limited to geographical location, demographics, type of venue or business at the site, and viewing statistics. The content manager also maintains the proof-of-play records and status information particular to content providers and makes them available to content providers to assist in further purchasing and scheduling of priority content. The content manager may also maintain information with respect to data gathered by feedback devices as described above at sites where display devices 50 and/or display controllers 60 are so equipped. Information gathered and maintained may be stored and retrieved, for example, by way of a database application such as Oracle®, Sybase®, MySQL®, or an equivalent.

In an embodiment, the content manager provides, by way of the server 10 or additional computer hardware in communication with the server 10, an interactive user-interface through which one or more content providers perform the functions outlined above as to creating, submitting, and scheduling priority content, managing transactions for the purchase of display time on one or more of the display devices 50, viewing proof-of-play records and status information particular to a content provider, browsing available display devices 50 and sites wherein display devices 50 are deployed sorted by category as above, and other functions to further enable the effective distribution of priority content provided by content providers. The server 10 is configured at least to receive media content in compatible formats as described above and make them available for retrieval by the PPS applications operating on display controllers 60.

In accordance with the invention, media content (e.g., advertising) may be provided from a content provider and delivered to a display controller 60 for display on a display device 50 in an entirely automated manner without requiring intervention from human personnel. In an exemplary embodiment, the time from submission of a media content by a content provider and ultimate delivery to a PPS application for presentation on a display device 50 is no more than 48 hours.

In an embodiment, the interactive user-interface is provided in the form of a web server application operating on the server 10 or additional computer hardware in communication with the server 10 configured to receive requests from computers 5 in communication with the server 10 over a wide-area network 20 by way of a browser application operating on a computer 5, e.g., Internet Explorer®, Mozilla® Firefox®, Google® Chrome, or an equivalent.

In an embodiment, the user-interface is provided as a SaaS solution.

In an embodiment, the user-interface provides real-time feedback to the content provider of when and how often one or more particular priority presentations are presented. The user-interface may also provide feedback as to priority content not displayed because of action taken by a site manager to disable a priority content from being displayed on a display device 50 or display device 50 at a site.

In an embodiment, the user-interface provides visual representations of the proof-of-play records to compare particular priority presentations scheduled for display with priority presentations as they are actually displayed on a display device 50 or at a site.

In an embodiment, the user-interface provides visual representations of data provided by the feedback devices as described above.

In an embodiment, the user-interface presents the information provided by proof-of-play records, status information, and information provided by the feedback devices to compiled information in visual forms for evaluation by content providers. The forms may be in compliance with industry standards such as provided by the Out-of-Home Video Advertising Bureau (OVAB).

In an embodiment, the information is provided in the form of feedback as a measure of unit impression, as defined by the OVAB, including statistics as to audience presence (people that see a display device 50 or set of related display devices 50), dwell time (how long a viewer is in a particular venue), media rotation (minutes of media presentation/hour), and media content length (in seconds).

In an embodiment, the user-interface provides tools for the creation and editing of priority media content. The tools may provide pre-configured templates and editing tools, as known in the art, for composing presentations of text and graphics (both still and animated) for presentation on the display devices 50 as priority media content. The tools may further include facilities to integrate with external news and information feeds (e.g., Internet-based news feeds, RSS, etc.), facilities to receive and incorporate media files of common formats (MPEG, WMV, JPEG, Flash®, etc.), and tools for arranging portions of the presentation on one or more different display portions of the display device 50.

In an embodiment, the user-interface provides an interactive, chronological representation of a schedule of media content for one or more display devices 50, enabling a content provider to purchase particular a time-slot(s) based on at least time of day, venue, audience size, and/or media content before or after the desired time-slot(s). In this embodiment, the user-interface may also provide information as provided by the site manager as to locally-based media content that is presented on one or more display devices, allowing a content provider to consider the media content that would play just before and just after the priority content would play.

In an embodiment, the user-interface provides means to record and debit an account particular to a content provider based on a quantity of impressions as provided above (or related methods), as well as for creation of content (if applicable).

In an embodiment, the user-interface provides a means for a content provider to arrange for a particular submitted media content to be prioritized for preferential or faster delivery to display controllers 60. In this embodiment, the user-interface may provide for an additional transaction in exchange for marking a media content as a priority.

In an embodiment, the server may communicate in real-time to the content provider that one or more media content has been completed at one or more display devices 50 or sites. In another embodiment, the communication may be in the form or an e-mail, an instant message, or the equivalent. In an exemplary embodiment, the communication may be in the form of a widget integrated with the user-interface described above. In another exemplary embodiment, this feature may be enabled by the content provider for one or more media content via the user-interface.

Thus, the invention provides an automated booking system for content providers wherein a content provider may submit media content (e.g., advertising content), browse available display devices based on demographic information, purchase screen time on selected display devices, and verify that the media content has been presented. Media players may therefore locate and sort networks that meet their audience requirements, timeframe, and budget requirements.

In an embodiment of the invention, a user-interface is also provided to site managers. This user-interface enables site managers to update and maintain the demographic and scheduling information of their display devices, and further provides a means for site managers to receive offers from content providers for display time on one or more display devices.

In this embodiment, the user-interface enables content providers to browse display time made available for priority content by the site manager based on display device and time of day, information on the display device including the demographic information audited as above. The user-interface provides means to receive an offer from the content manager to buy available display time, and provides same to the user-interface for the site manager. The user-interface further provides means to receive an acceptance or denial from the site manager with respect to the offer. If the site manager accepts the offer, the server 10 transmits the content provider's priority content to the display controller(s) corresponding to the designated display device(s) and commands the PPS on the display controller(s) to schedule the priority content for playback.

In an embodiment, upon receiving proof-of-play of the priority content, the account of the content provider is debited and an account of the site manager is credited. In an exemplary embodiment, a percentage of the amount debited from the content provider is credited to an account of the site manager as a commission. The user-interface provides an information display for site managers summarizing how much revenue is generated by each display device (as well as an entire network) and also may summarize the operational status of each display device and what media content is or has been scheduled to play on it.

Thus, the invention provides an automated marketplace for site managers to sell display time on their display devices and for content providers to buy display time, the system and method providing automating negotiation of pricing for display time based on the value of the display, delivery of content to the display devices, verification that the media content was presented, and transaction of funds between the content provider, site manager, and content manager.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (cd-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

In the preceding description, for purposes of explanation, numerous details are set forth in order to provide a thorough understanding of the embodiments of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

The invention as described herein may comprise one, several, all, or any of the embodiments provided above in any combination. The above-described embodiments of the present invention are intended to be examples only. Alterations, modifications and variations can be effected to the particular embodiments by those of skill in the art without departing from the scope of the invention, which is defined solely by the claims appended hereto.

I claim:

1. A system for presenting media content in a public space, comprising:
    a display device; and
    a display controller, comprised of a CPU and a storage device, the storage device having recorded thereon an operating system adapted to control the CPU, a main presentation application, and a priority presentation application,
    the operating system, the main presentation application, and the priority presentation application adapted to operate concurrently on the CPU,
    the main presentation application configured to cause the display device, by way of the operating system of the display controller, to present a main display content as a main presentation, and the priority presentation application configured to, in response to a trigger, cause the display device, by way of the operating system of the display controller, to present a priority display content as a priority presentation, and to exclude the main presentation of the main presentation application from the display device for an entire duration of the priority presentation, and further configured to cause, through the operating system, a resumption of the main presentation on said display device upon completion of the priority presentation, wherein said main and priority display content each comprise any of still or motion video information, wherein the priority presentation application is configured to be triggered by trigger information embedded in a playlist executed by the main presentation application, wherein said priority display content is third party advertising content, wherein the display controller further comprises a network interface in connection with a network, wherein the priority presentation application is further configured to cause the CPU to retrieve, over the network by way of the network interface, the priority display content from a content management server on the network, wherein the priority presentation application is further configured to cause the CPU to record on the storage device, upon the completion of the priority presentation, a proof-of-play information indicating that the priority presentation has been completely presented, and also configured to cause the CPU to transmit, over the network by way of the network interface, and wherein the priority presentation application is further configured to cause the CPU to transmit, over the network by way of the network interface, the proof-of-play information to a content management server on the network.

2. The system according to claim 1,
wherein the display controller further comprises a network interface in connection with a network, and
wherein the priority presentation application is further configured to cause the CPU to retrieve, over the network by way of the network interface, the priority display content from a content management server on the network.

3. The system according to claim 1,
wherein the priority presentation application is further configured to cause the CPU to record on the storage device, upon the completion of the priority presentation, a proof-of-play information indicating that the priority presentation has been completely presented, and also configured to cause the CPU to transmit, over the network by way of the network interface.

4. The system according to claim 3,
wherein the display controller further comprises a network interface in connection with a network, and
wherein the priority presentation application is further configured to cause the CPU to transmit, over the network by way of the network interface, the proof-of-play information to a content management server on the network.

5. The system according to claim 1, further comprising:
an audio output device connected to said display controller, the display controller configured to generate sound through the audio output device,
wherein the main and priority display content each further comprise audio information, wherein the main presentation application is configured to cause the audio output device, by way of the operating system, to present the audio information of the main display content, and the priority presentation application is configured, upon the presentation of the priority presentation on the display device, to cause the audio output device, by way of the operating system, to present the audio information of the priority display content, and to exclude the audio information of the main display content from the audio output device for the entire duration of the priority presentation, and further configured to cause, through the operating system, a resumption of the audio information of the main display content through said audio output device upon completion of the priority presentation.

6. The system according to claim 1,
wherein the trigger information received from the main presentation application is in accordance with the HTTP protocol.

7. The system according to claim 1,
wherein the priority presentation application is configured to be triggered by a clock in accordance with a pre-determined schedule.

8. The system according to claim 1,
wherein the priority presentation application is further configured to interpret one or more parameters provided within the trigger information to control the priority presentation.

9. The system according to claim 7,
wherein pre-determined schedule is a queue.

10. The system according to claim 8,
wherein the one or more parameters control the duration of the priority presentation.

11. The system according to claim 8,
wherein the one or more parameters control the priority display content of the priority presentation.

12. A software product for presenting media content on a display controlled by a computer comprised at least of a processing unit and a memory for storing data, the software product recorded on a computer readable medium and configured to cause the computer to:

listen for a trigger event;

upon detection of the trigger event, exclude a main presentation program running on the computer from causing the computer to present a main presentation on the display, and present a priority presentation on the display for an entire duration of the priority presentation; and upon completion of the entire duration of the priority presentation, resume the main presentation of the main presentation program on the display, wherein the main and priority presentations each comprise any of still or motion video information, wherein the trigger event occurs upon the main presentation program executing a playlist having trigger information embedded therein, wherein said priority presentation is third party advertising content, retrieve, over a network by way of a network interface connected to the computer, the priority display content from a content management server on the network;

record on a storage device of the computer, upon the completion of the priority presentation, a proof-of-play information indicating that the priority presentation has been completely presented; and transmit, over the network by way of the network interface, the proof-of-play information to the content management server on the network.

13. The software product according to claim 12, further configured to cause the computer to:
retrieve, over a network by way of a network interface connected to the computer, the priority display content from a content management server on the network.

14. The software product according to claim 12, further configured to cause the computer to:
record on a storage device of the computer, upon the completion of the priority presentation, a proof-of-play information indicating that the priority presentation has been completely presented.

15. The software product according to claim 14, further configured to cause the computer to:
transmit, over a network by way of a network interface connected to the computer, the proof-of-play information to a content management server on the network.

16. The software product according to claim 12, further configured to cause the computer to:
at the same time as the computer is caused to exclude the main presentation program from causing the computer to present the main presentation on the display and instead to present the priority presentation on the display, causing the computer to exclude the main presentation program from causing the computer to present an audio portion of the main presentation through an audio output device connected to the computer, and also causing the computer to present an audio portion of the priority presentation on the display for the entire duration of the priority presentation through the audio output device; and upon completion of the entire duration of the priority presentation, cause the computer to restore the main presentation program to causing the computer to present the audio portion of the main presentation,
wherein the audio output device is configured to produce sound corresponding to the audio portion of the main and priority presentations.

17. The software product according to claim 12,
wherein the trigger event is caused by a peripheral device in connection with the computer.

18. The software product according to claim 12,
wherein the trigger event is caused by a network event.

19. The software product according to claim 18, further configured to cause the computer to, upon detecting the network event, parse a message received by a network interface for one or more control parameters, and further to control the presentation of the priority presentation on the display in accordance with the one or more control parameters.

20. The software product according to claim 19,
wherein the one or more control parameters is used by the computer to control the duration of the priority presentation.

21. The software product according to claim 19,
wherein the one or more control parameters is used by the computer to control the priority display content of the priority presentation.

22. The software product according to claim 12,
wherein the trigger event is caused by a clock in accordance with pre-determined schedule data stored in the memory of the computer.

23. The software product according to claim 22,
wherein pre-determined schedule data is a queue.

\* \* \* \* \*